US011973526B2

(12) United States Patent
Yang et al.

(10) Patent No.: US 11,973,526 B2
(45) Date of Patent: Apr. 30, 2024

(54) ASSEMBLY STRUCTURE FOR ELECTRONIC DEVICE PROTECTING CASING AND INTERFACING STRUCTURE WITH MAGNETIC CONNECTORS

(71) Applicants: Sampson Yang, Irvine, CA (US); Yun-Chang Tsui, Taipei (TW)

(72) Inventors: Sampson Yang, Irvine, CA (US); Yun-Chang Tsui, Taipei (TW)

(73) Assignee: THE JOY FACTORY, INC., Irvine, CA (US)

( * ) Notice: Subject to any disclaimer, the term of this patent is extended or adjusted under 35 U.S.C. 154(b) by 308 days.

(21) Appl. No.: 17/500,933

(22) Filed: Oct. 13, 2021

(65) Prior Publication Data

US 2023/0113066 A1 Apr. 13, 2023

(51) Int. Cl.
*H04B 1/3888* (2015.01)
*G06F 1/16* (2006.01)

(52) U.S. Cl.
CPC ......... *H04B 1/3888* (2013.01); *G06F 1/1626* (2013.01); *G06F 1/1656* (2013.01)

(58) Field of Classification Search
None
See application file for complete search history.

(56) References Cited

U.S. PATENT DOCUMENTS

2017/0300093 A1* 10/2017 Hamann .................. G06F 1/189
2018/0145713 A1* 5/2018 Pike, II ................ H04B 1/3888

* cited by examiner

*Primary Examiner* — Frantz Bataille

(57) ABSTRACT

An assembly structure for an electronic device protecting casing and an interfacing structure with magnetic connectors includes a protecting casing for protecting a tablet form electronic device and an interfacing device for power or signal transferring to or from the protecting casing. The protecting casing includes a casing side connector. The casing side connector includes an inner connector and an outer connector. The interfacing device includes an interfacing connector. A magnetic connecting device is used for mechanically and magnetically connecting an interfacing connector of the interfacing device with an outer connector of the protecting casing. The magnetic connecting device includes at least one interfacing side magnetic unit which is installed on the interfacing device at the same side installing the interfacing connector, and at least one casing side magnetic unit which is installed one the casing side connector at the same side having the outer connector.

12 Claims, 14 Drawing Sheets

US 11,973,526 B2

ASSEMBLY STRUCTURE FOR ELECTRONIC DEVICE PROTECTING CASING AND INTERFACING STRUCTURE WITH MAGNETIC CONNECTORS

FIELD OF THE INVENTION

The present invention is related to connections of an electronic device protecting casings with an interfacing device, and in particular to an assembly structure for an electronic device protecting casing and an interfacing structure with magnetic connectors.

BACKGROUND OF THE INVENTION

The prior art protecting casing of a tablet form electronic device is arranged with a casing side connector for transferring signals or power from the tablet form electronic device (such as a mobile phone, a tablet computer, or a PDA, etc.) within the protecting casing. The casing side connector serves to interface the tablet form electronic device within the protecting casing and external connectors so that the tablet form electronic device is signally or power connected to the external devices. The casing side connector includes an inner connector and an outer connector. The inner connector is signally or power connected to the outer connector. The inner connecter serves to interface a connector of the tablet form electronic device within the protecting casing.

The external connector is a general form connector. In use, the external connector is connected to the outer connecter by a male terminal to insert to a female terminal so as to achieve the object of signal or power connection. In this from, the external connector is needed and the external connector is connected to a connecting line which is bared out and easy to vibrate. Furthermore in use, the insertion and detaching is easy to be destroyed as they are used for a long time. It is equal to the status that the protecting casing cannot be operated. Therefore, the inventor of the present invention desired to provide a novel structure which is improved the defect in the prior art connecting structure of the protecting casing. The novel structure is simple, less vibration, so that the connector is retained with a longer lifetime and the lifetime of the protecting casing is prolonged.

SUMMARY OF THE INVENTION

Accordingly, the object of the present invention is to provide an assembly structure for an electronic device protecting casing and an interfacing structure with magnetic connectors, wherein the outer connector of the protecting casing is magnetically connected to the interfacing connector of the interfacing device. Therefore, in operation, the user can rapidly and precisely align the male and female connectors. The structure of the present invention is simpler than any conventional structure and thus it has a longer lifetime. Furthermore the interfacing device can be connected to a router and thus it can be used to various applications.

To achieve above object, the present invention provides an assembly structure for an electronic device protecting casing and an interfacing structure with magnetic connectors, comprising: a protecting casing for protecting a tablet form electronic device; the protecting casing being a casing for receiving a tablet form electronic device; an interfacing device for power or signal transferring to or from the protecting casing; wherein the protecting casing includes a casing side connector for connecting to a tablet form electronic device within the protecting casing and the interfacing device so that the tablet form electronic device within the protecting casing can signal or power connect to external device; the casing side connector includes an inner connector and an outer connector; the inner connector is signally or power connecting to the outer connector; and the inner connector serves to connect with the tablet form electronic device within the protecting casing; wherein the interfacing device includes an interfacing connector; the outer connector of the protecting casing is used to connect with the interfacing connector of the interfacing device; therefore, the tablet form electronic device within the protecting casing is signally or power connected externally through the interfacing device; and a magnetic connecting device for mechanically and magnetically connecting the interfacing connector of the interfacing device with the outer connector of the protecting casing; the magnetic connecting device includes at least one interfacing side magnetic unit which is installed on the interfacing device at the same side installing the interfacing connector, and at least one casing side magnetic unit which is installed one the casing side connector at the same side having the outer connector; the interfacing side magnetic unit is positioned corresponding to the position of the casing side magnetic unit so that the interfacing device is magnetically connect to the casing side connector.

DETAILED DESCRIPTION OF THE INVENTION

Figure 1:
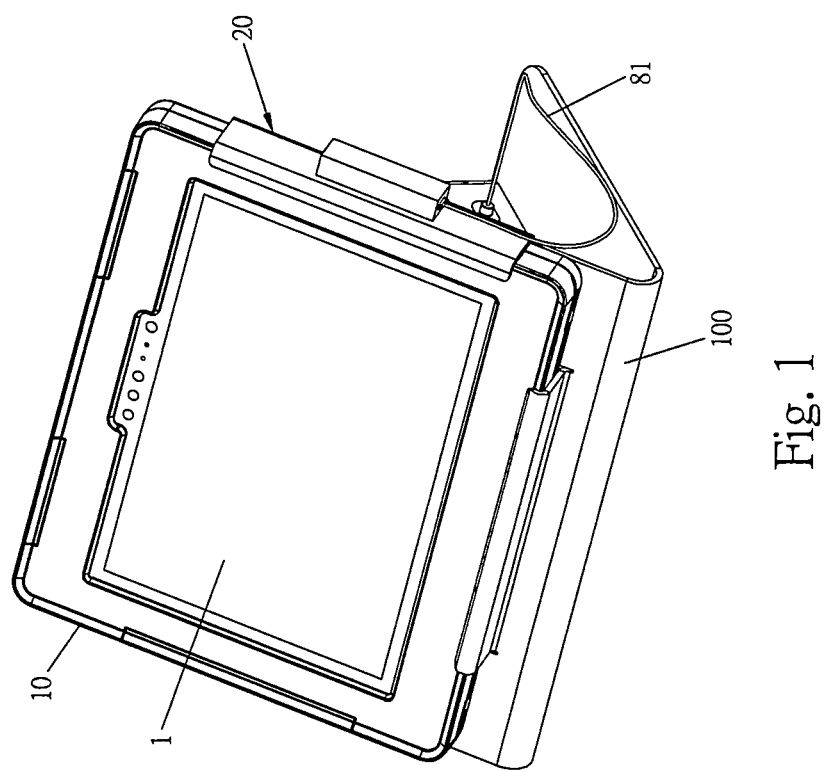
FIG. 1 is an assembly schematic view of the first embodiment of the present invention.
Figure 2:
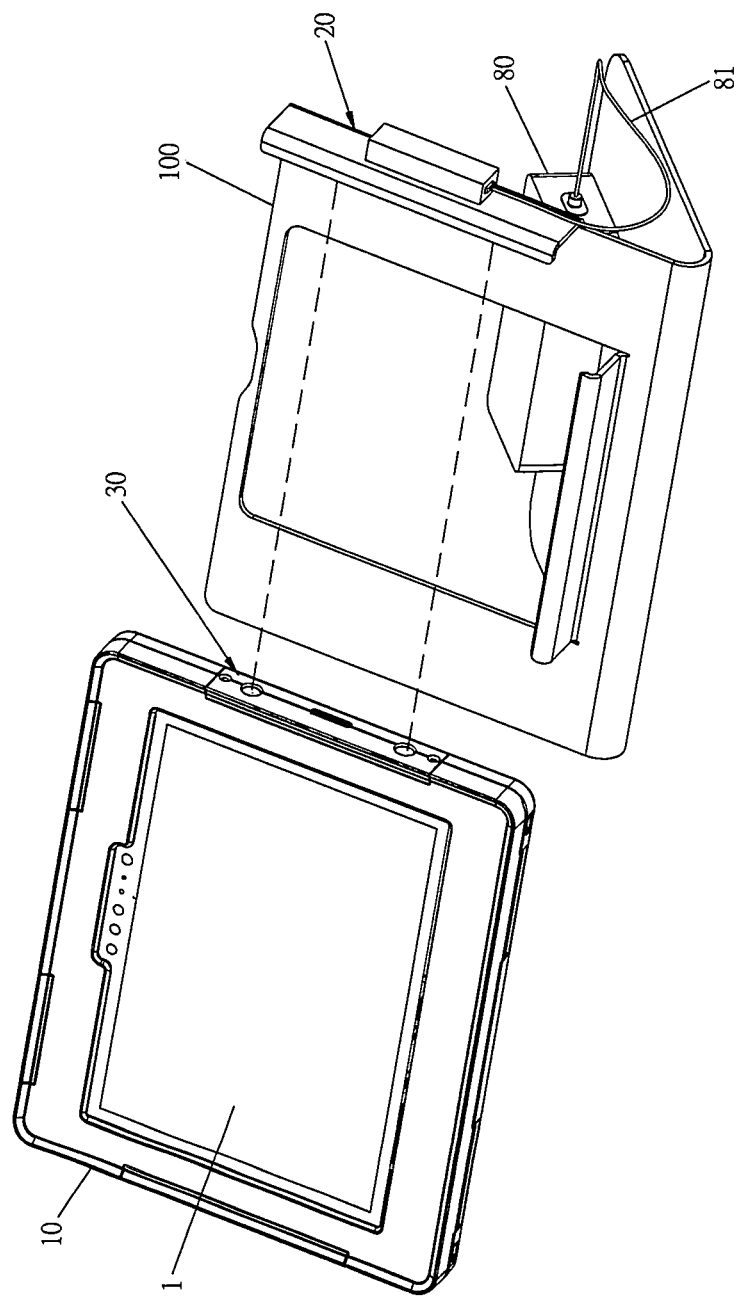
FIG. 2 is an exploded schematic view about the protecting casing and the interfacing device of the first embodiment of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 14, the structure of the present invention is illustrated. The present invention includes the following elements.

A protecting casing 10 serves for protecting a tablet form electronic device 1 (such as those shown in FIGS. 1 to 7). The protecting casing 10 is a casing for receiving a tablet form electronic device, such as a mobile phone, a tablet computer, a notebook computer, or a PDA, etc.

An interfacing device 20 serves for power or signal transferring to or from the protecting casing 10.

With reference to FIGS. 2 to 8, the protecting casing 10 includes a casing side connector 30 for connecting to a tablet form electronic device 1 within the protecting casing 10 and the interfacing device 20 so that the tablet form electronic device 1 within the protecting casing 10 can signal or power connect to external device (not shown). The casing side connector 30 includes an inner connector 31 (referring to FIGS. 4 and 11) and an outer connector 32 (referring to FIGS. 3 and 10). The inner connector 31 is signally or power connecting to the outer connector 32. The inner connector 31 serves to connect with a connector (not shown) of the tablet form electronic device 1 within the protecting casing 10.

The interfacing device 20 includes an interfacing connector 40. The outer connector 32 of the protecting casing 10 is used to connect with the interfacing connector 40 of the interfacing device 20. Therefore, the tablet form electronic device 1 within the protecting casing 10 is signally or power connected to external device (not shown) through the interfacing device 20.

The present invention further includes a magnetic connecting device 50 for mechanically and magnetically connecting the interfacing connector 40 of the interfacing device 20 with the outer connector 32 of the protecting casing 10. The magnetic connecting device 50 includes at least one interfacing side magnetic unit 52 which is installed on the interfacing device 20 at the same side installing the interfacing connector 40, and at least one casing side magnetic unit 51 which is installed one the casing side connector 30 at the same side having the outer connector 31.

Figure 3:
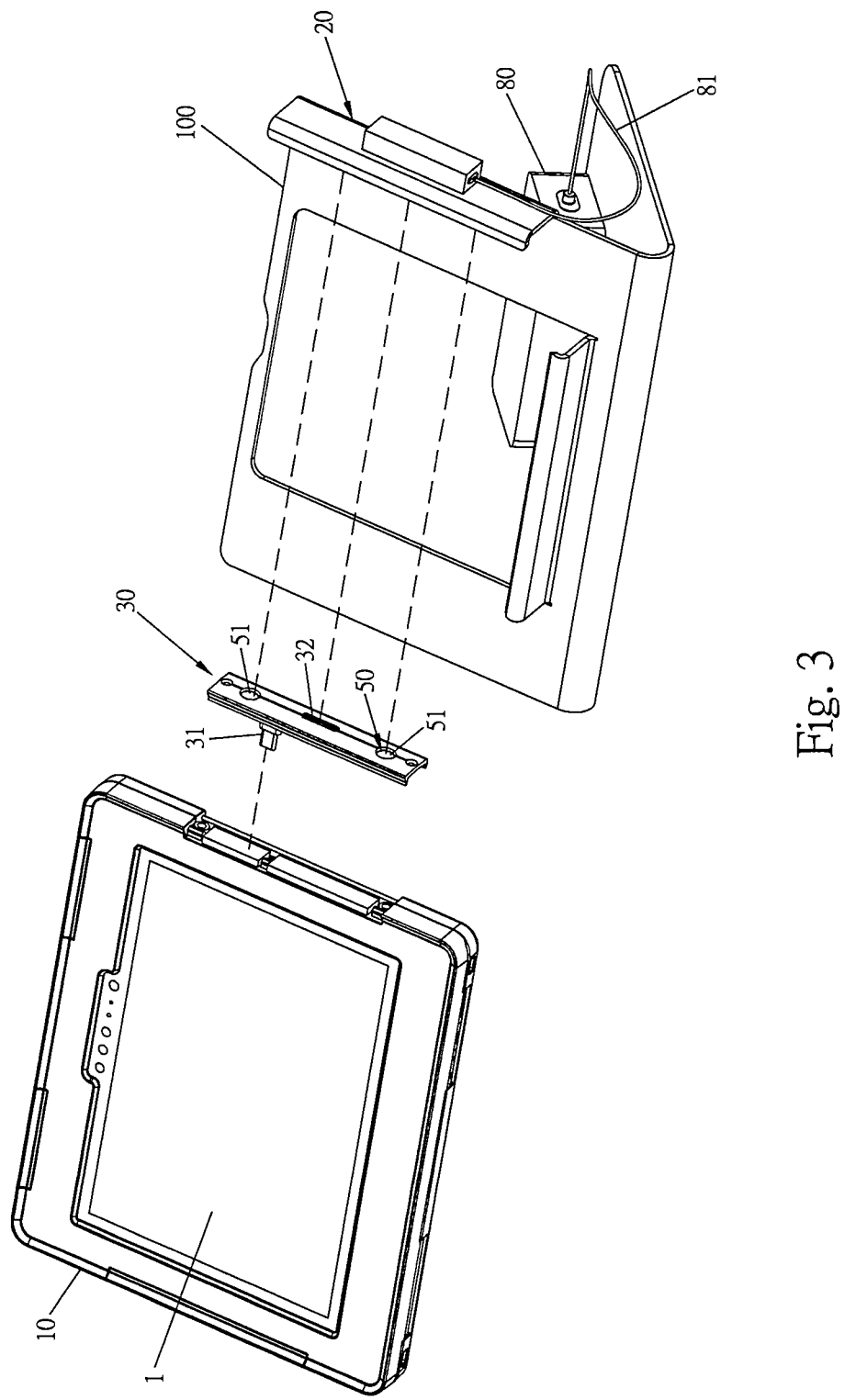
FIG. 3 is an exploded schematic view showing the protecting casing and the interfacing device in the first embodiment of the present invention.
Figure 4:
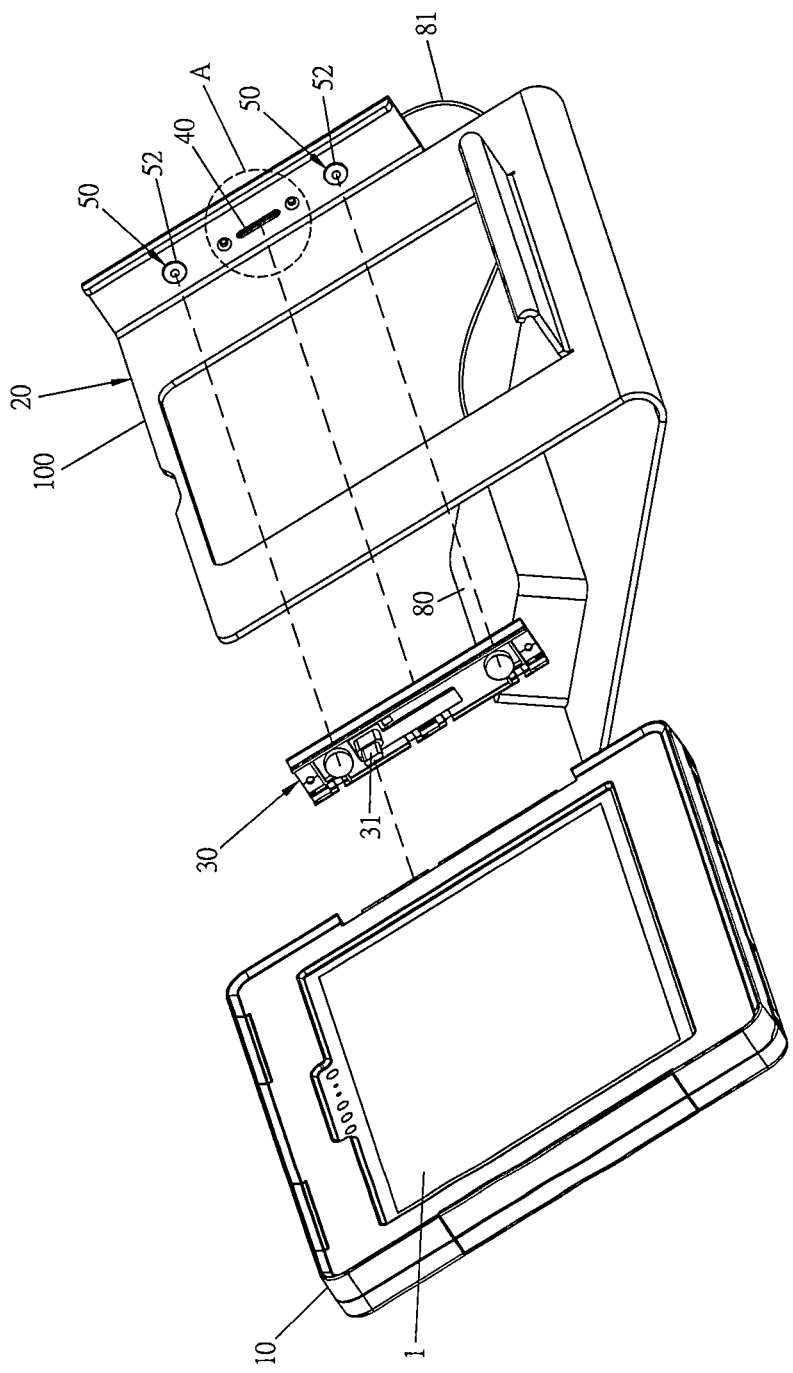
FIG. 4 is a schematic view from another view angle of FIG. 3.
Figure 5:
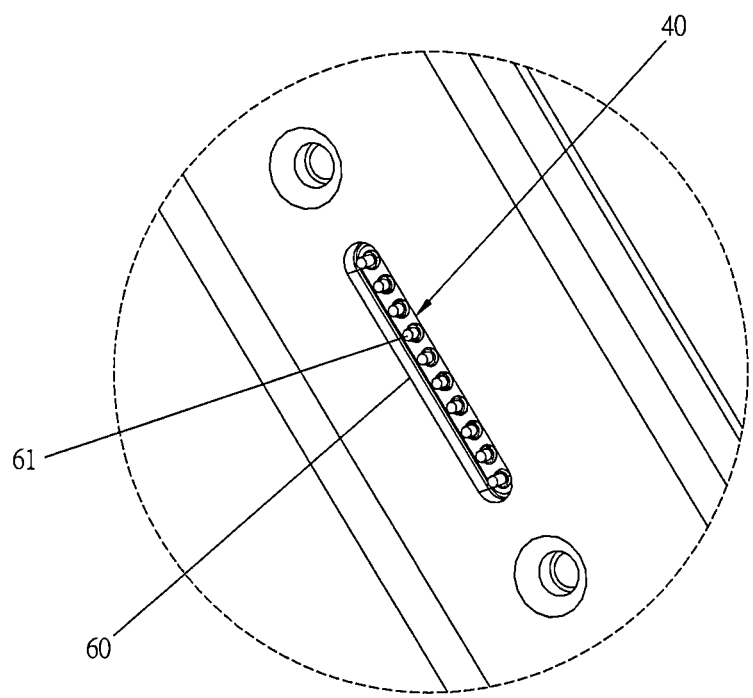
FIG. 5 is an enlarged schematic view showing the A area in FIG. 4.
Figure 6:
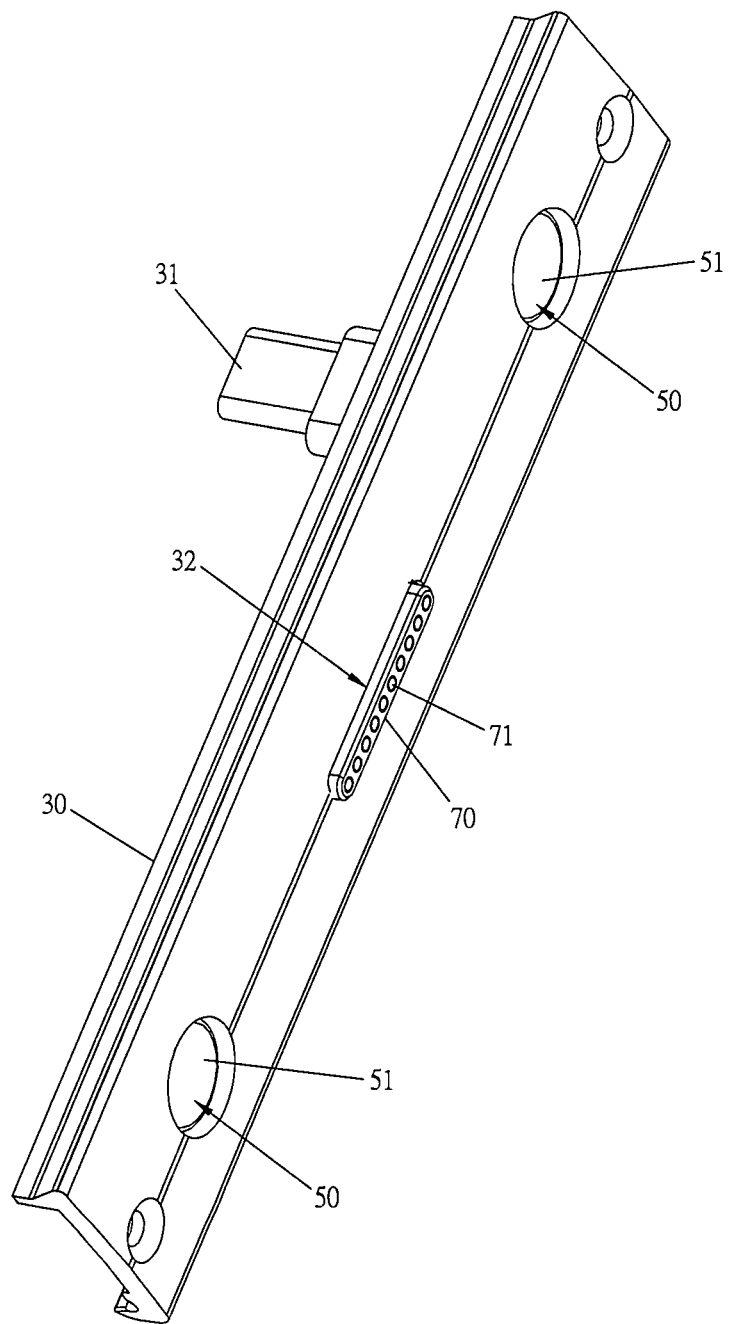
FIG. 6 is a schematic view showing the casing side connector in the first embodiment of the present invention.
Figure 7:
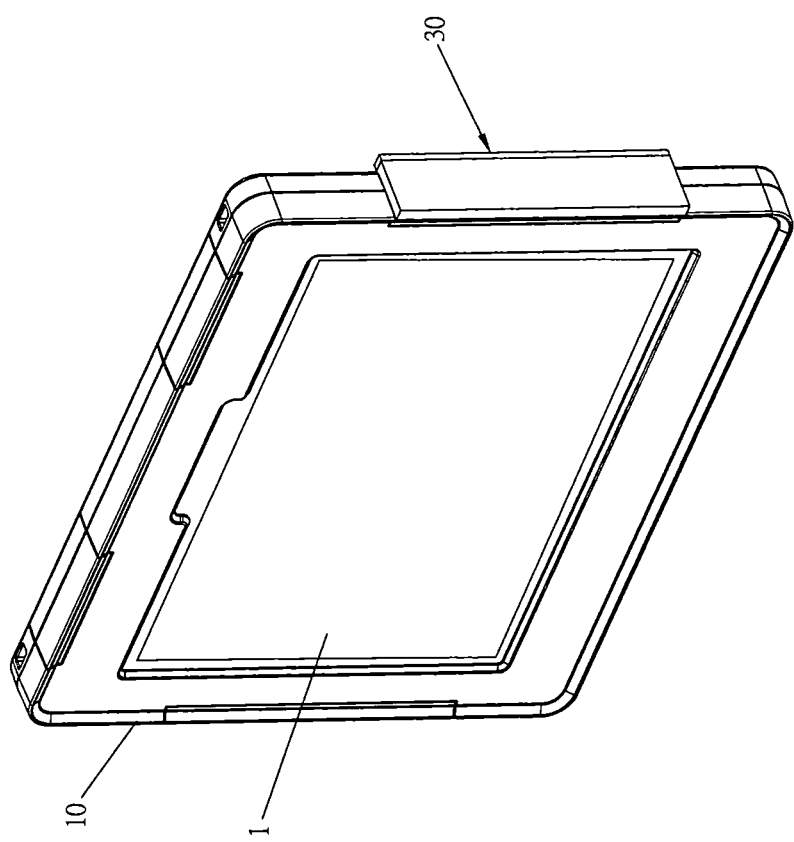
FIG. 7 is an assembly schematic view showing the elements in the second embodiment of the present invention.
Figure 8:
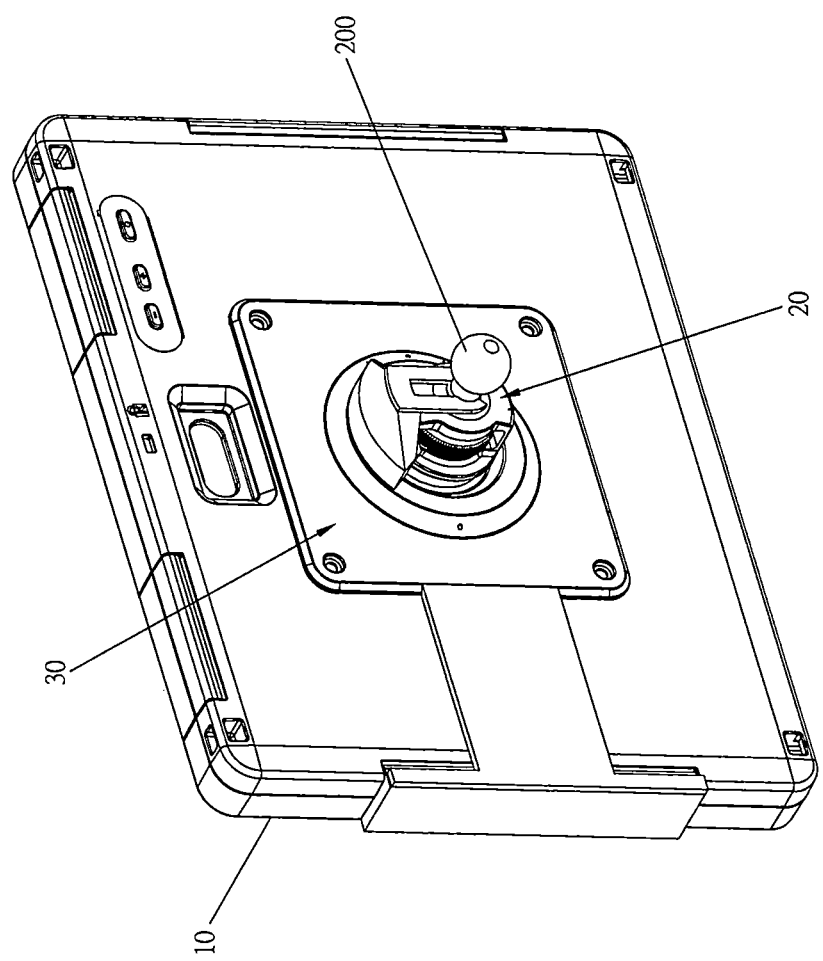
FIG. 8 is a schematic view showing the elements in the second embodiment of the present invention.
Figure 9:
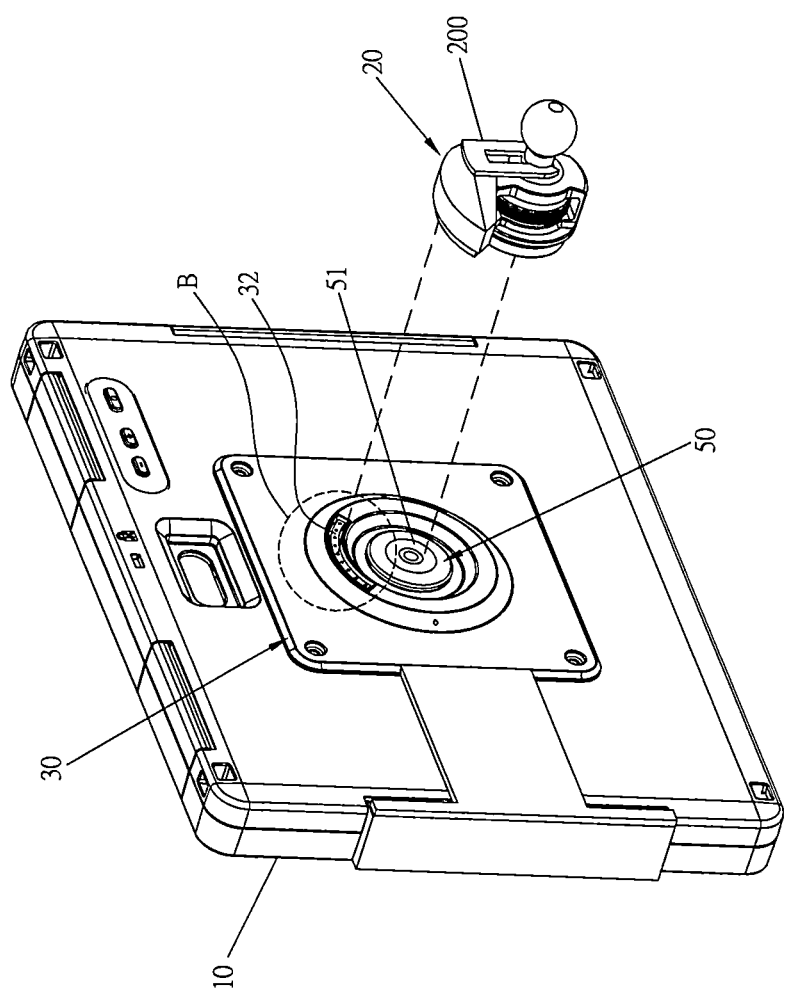
FIG. 9 is an exploded schematic view showing the protecting casing and interfacing device in the second embodiment of the present invention.
Figure 10:
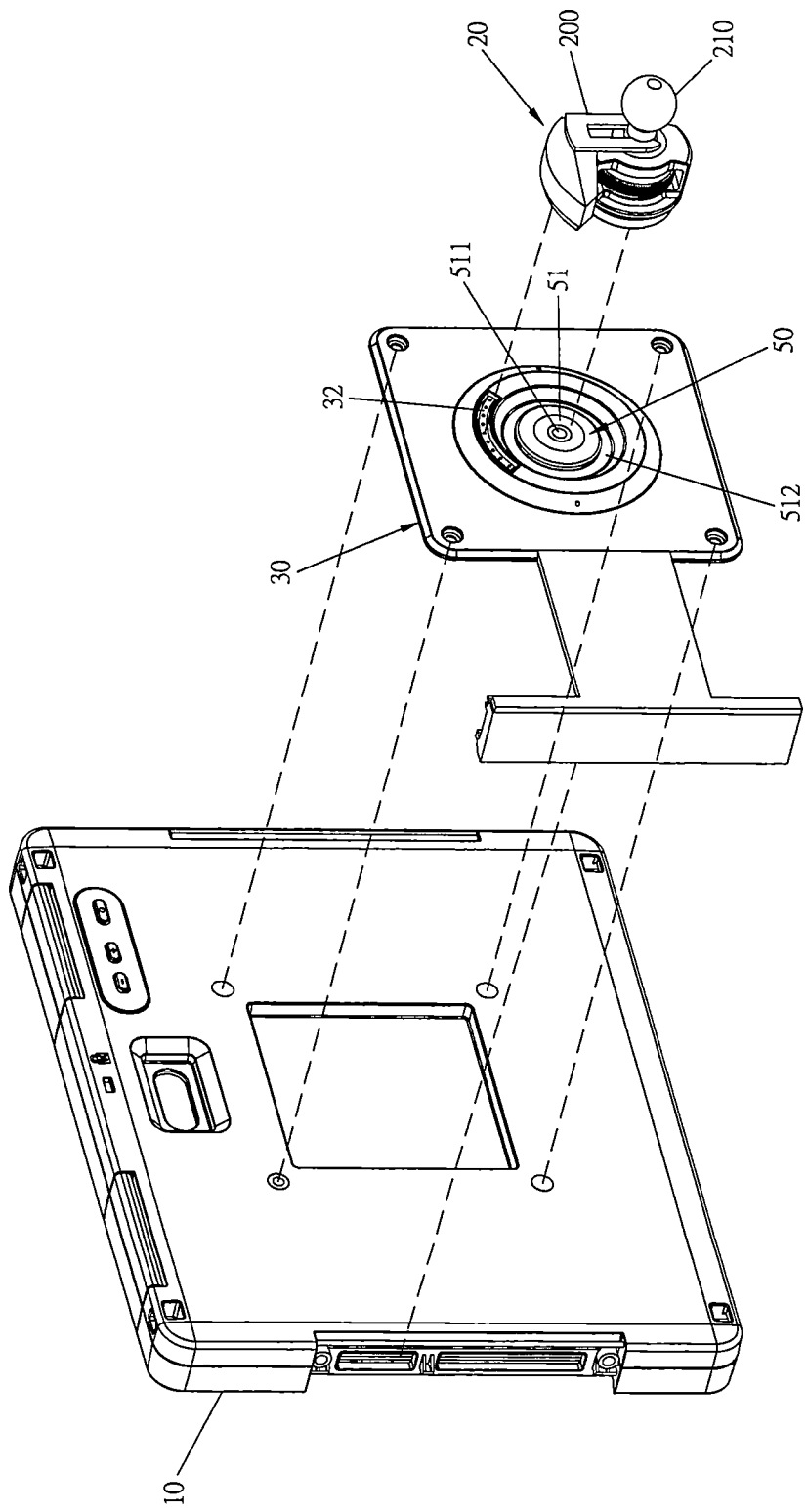
FIG. 10 is an exploded schematic view showing the protecting casing, case side connector and interfacing device in the second embodiment of the present invention.
Figure 11:
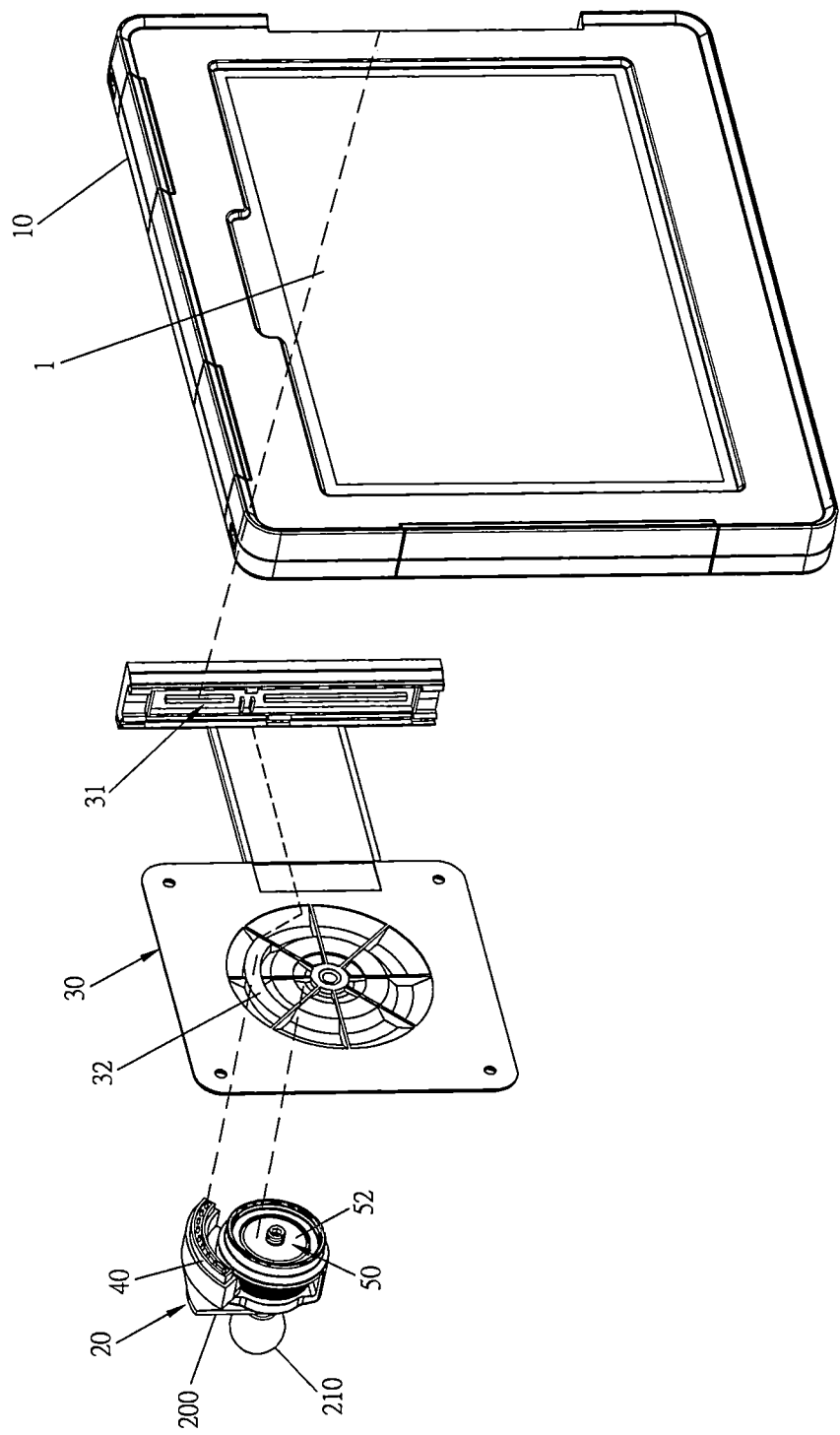
FIG. 11 is a schematic view showing another view angle of FIG. 10.
Figure 12:
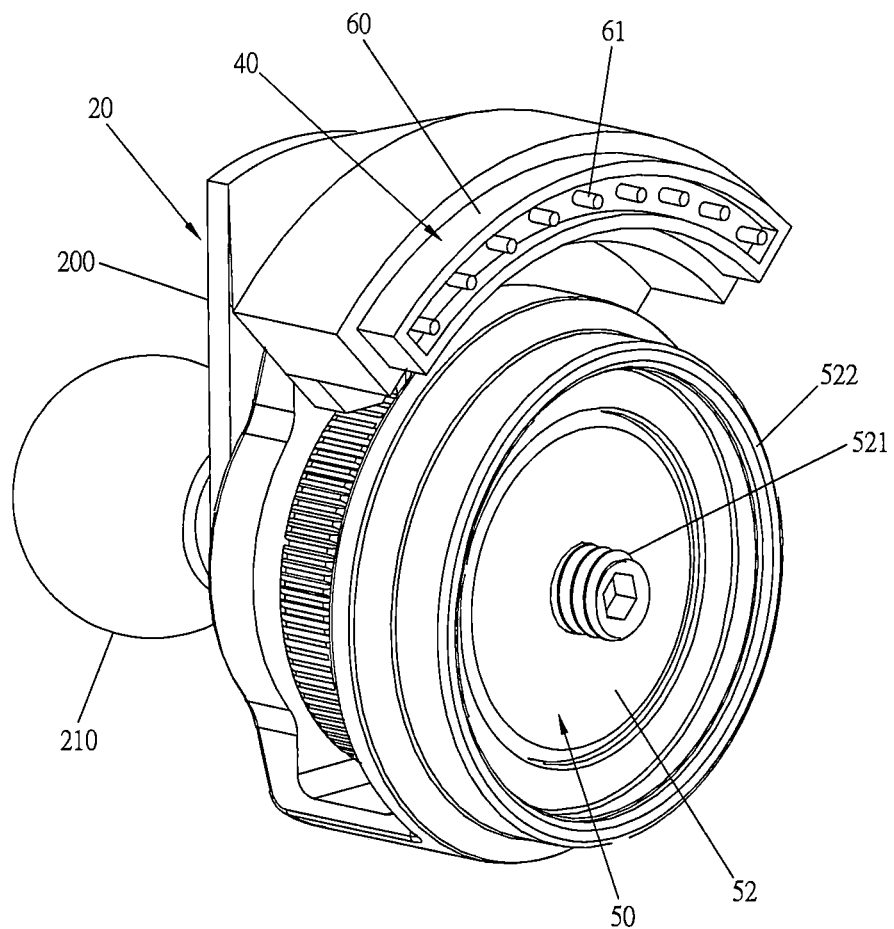
FIG. 12 is a schematic view showing the interfacing connector in the second embodiment of the present invention.
Figure 13:
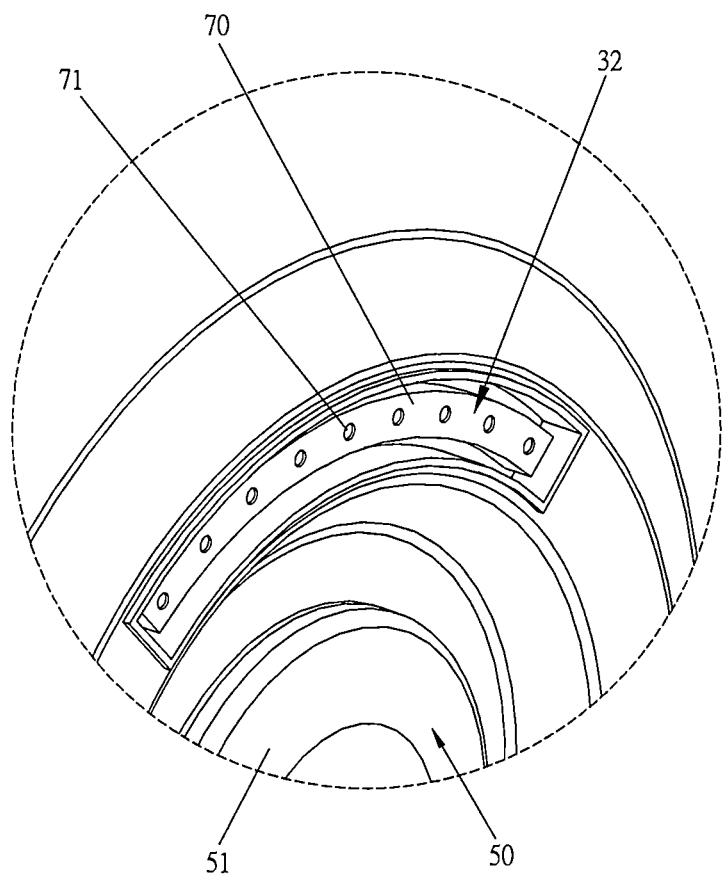
FIG. 13 is an enlarged schematic view of the B area in FIG. 9.

In installation, the interfacing side magnetic unit 52 is positioned corresponding to the position of the casing side magnetic unit 51 so that the interfacing device 20 can magnetically connect to the casing side connector 30. With reference to FIGS. 3 and 4, in the present invention, the numbers of the interfacing side magnetic unit 52 and the casing side magnetic unit 51 are not confined to one, which can be arranged as desired. Referring to FIGS. 3 and 4, it is illustrated that two opposite sides of the interfacing connector 40 are arranged with respective respective interfacing side magnetic units 52; and two opposite sides of the outer connector 32 are arranged with respective casing side magnetic units 51. Or as illustrated in FIGS. 10 and 11, only one side of the interfacing connector 40 is arranged with an interfacing side magnetic unit 52, and one side of the outer connector 32 is arranged with one casing side magnetic unit 51.

In the present invention, the connection of the outer connector 32 of the protecting casing 10 and the interfacing connector 40 of the interfacing device 20 may be arranged as desired so that one is a mail connector 60 and another is a female connector 70. Preferably, one of a male connector 60 has a protruded male terminal 61 on the interfacing connector 40 (referring to FIGS. 5 and 12). And another is a male connector 70 with a flat form female terminal 71 on the casing side connector 30 (referring to FIGS. 6 and 13) so that the male connector 69 can be easily connected to the female connector 70.

Preferably, the number of the interfacing side magnetic units 52 is equal to that of the casing side magnetic units 51 so that the interfacing side magnetic units 52 are easily absorbed magnetically the casing side magnetic units 51 and thus the outer connector 32 is aligned to the interfacing connector 40. Therefore, the males terminals 61 are aligned to the female terminals 71, as a result, the user can easily insert the outer connector 32 of the protecting casing 10 to the interfacing connector 40 of the interfacing device 20 and the male terminals 61 are also aligned to the female terminals 71.

With reference to FIGS. 3 and 4, the interfacing connector 40 of the interfacing device 20 is connected to a connecting line 81. The connecting line 81 can be further connected with a router 80. The router 80 includes various forms of joints (not shown) for matching with the joint (not shown) of the connecting line 81. Therefore, through the router 80, the tablet form electronic device 1 in the protecting casing 10 can be connected to external applications (not shown).

With reference to FIGS. 1 to 6, in the present invention, the first embodiment of the interfacing device 20 and the casing side connector 30 is illustrated. In that, the interfacing device 20 is an independent device. The drawing shows that the interfacing device 20 is a supporting frame 100 for supporting the protecting casing 10. Therefore, the power or signals from the tablet form electronic device 1 in the protecting casing 10 can be transferred out through the interfacing device 20.

With reference to FIGS. 7 to 13 shows the second embodiment of the present invention, the interfacing device 20 is a device which is used to be arranged to on various devices. The drawing shows that the interfacing device 20 is a connecting frame 200 for connecting the protecting casing 10 and an external supporting device (not shown). Therefore, the power or signals from the tablet form electronic device 1 in the protecting casing 10 can be transferred out through the interfacing device 20. The interfacing connector 40 has a curved shape. The at least one interfacing side magnetic unit 52 of the magnetic connecting device 50 is an interfacing side magnetic unit 52 which has an annular shape. The connecting frame 200 further includes a protruded unit 521 located at a center of the interfacing side magnetic unit 52, and an annular wall 522 surrounding an outer side of the interfacing side magnetic unit 52. The interfacing. connector 40 is positioned at an outer side of the annular wall 522. The outer connector 32 has a curved shape. The at least one casing side magnetic unit 51 of the magnetic connecting device 50 is a casing side magnetic unit 51 which has an annular shape. The casing side connector 30 further includes a concave hole 511 located at a center of the casing side magnetic unit 51 for receiving the protruded unit 521, and an annular groove 512 surrounding an outer side of the casing side magnetic unit 51. The outer connector 32 is positioned at an outer side of the annular groove 512. The connecting frame 200 further includes a first ball 210. The interfacing side magnetic unit 52 is connected between the casing side magnetic unit 51 and the first ball 210.

Figure 14:
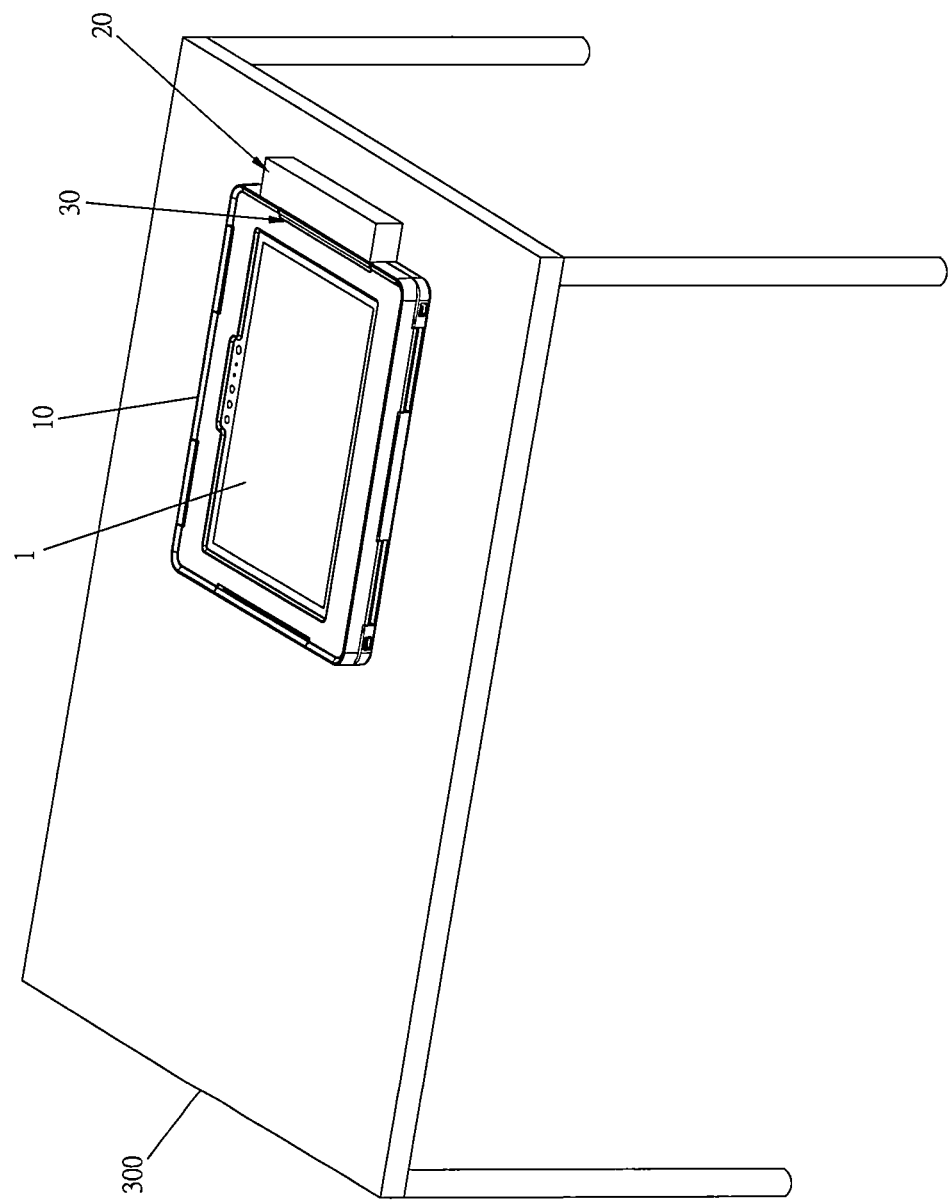
FIG. 14 is an assembly schematic view showing the third embodiment of the present invention.

FIG. 14 shows the third embodiment about the interfacing device 20 and the casing side connector 30 of the present invention. In that, the interfacing device 20 is a single independent device, or a device which is arranged on various external device (in this example, it is device on a table 300). Therefore, the power or signals from the tablet form electronic device 1 in the protecting casing 10 can be transferred out through the interfacing device 20.

Advantages of the present invention are that: the outer connector of the protecting casing is magnetically connected to the interfacing connector of the interfacing device. Therefore, in operation, the user can rapidly and precisely align the male and female connectors. The structure of the present invention is simpler than any conventional structure and thus it has a longer lifetime. Furthermore the interfacing device can be connected to a router and thus it can be used to various applications.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An assembly structure for an electronic device protecting casing and an interfacing structure with magnetic connectors, comprising:
   a protecting casing for protecting a tablet form electronic device; the protecting casing being a casing for receiving a tablet form electronic device;
   an interfacing device for signal transferring to or from the protecting casing; and
   wherein the protecting casing includes a casing side connector for connecting to a tablet form electronic device within the protecting casing and the interfacing device so that the tablet form electronic device within the protecting casing can signal connect to external device; the casing side connector includes an inner connector and an outer connector; the inner connector is signally connected to the outer connector; and the inner connector serves to connect with the tablet form electronic device within the protecting casing; and
   wherein the interfacing device includes an interfacing connector; the outer connector of the protecting casing is used to connect with the interfacing connector of the interfacing device; the tablet form electronic device within the protecting casing is signally connected externally through the interfacing device;
   a magnetic connecting device for mechanically and magnetically connecting the interfacing connector of the interfacing device with the outer connector of the protecting casing; the magnetic connecting device includes at least one interfacing side magnetic unit which is installed on the interfacing device at the same side installing the interfacing connector, and at least one casing side magnetic unit which is installed one the casing side connector at the same side having the outer connector; the interfacing side magnetic unit is positioned corresponding to a position of the casing side magnetic unit so that the interfacing device is magnetically connect to the casing side connector.

2. The assembly structure for an electronic device protecting casing and an interfacing structure with magnetic connectors as claimed in claim 1, wherein the numbers of the interfacing side magnetic unit and the casing side magnetic unit are not confined to one.

3. The assembly structure for an electronic device protecting casing and an interfacing structure with magnetic connectors as claimed in claim 1, wherein a number of the casing side magnetic units is equal to that of the interfacing side magnetic units.

4. The assembly structure for an electronic device protecting casing and an interfacing structure with magnetic connectors as claimed in claim 1, wherein one of the outer connector of the protecting casing and interfacing connector of the interfacing device is a male connector and another one of the outer connector of the protecting casing and interfacing connector of the interfacing device is a female connector.

5. The assembly structure for an electronic device protecting casing and an interfacing structure with magnetic connectors as claimed in claim 4, wherein one of a male connector has a protruded male terminal on the interfacing connector; and another is a male connector with a flat form female terminal on the casing side connector so that the male connector can be connected to the female connector.

6. The assembly structure for an electronic device protecting casing and an interfacing structure with magnetic connectors as claimed in claim 1, wherein the interfacing connector of the interfacing device is connected to a connecting line; the connecting line is further connected with a router; the router includes various joints of different forms for matching with the joint of the connecting line; therefore, through the router, the tablet form electronic device in the protecting casing is connected to external applications.

7. The assembly structure for an electronic device protecting casing and an interfacing structure with magnetic connectors as claimed in claim 1, wherein the interfacing device is a supporting frame for supporting the protecting casing; therefore, signals from the tablet form electronic device in the protecting casing is transferred out through the interfacing device.

8. The assembly structure for an electronic device protecting casing and an interfacing structure with magnetic connectors as claimed in claim 1, wherein the interfacing device is a connecting frame for connecting the protecting casing and an external supporting device; therefore, signals from the tablet form electronic device in the protecting casing is transferred out through the interfacing device; and
   wherein the interfacing connector has a curved shape; the at least one interfacing side magnetic unit of the magnetic connecting device is an interfacing side magnetic unit which has an annular shape; the connecting frame further includes a protruded unit located at a center of the interfacing side magnetic unit, and an annular wall surrounding an outer side of the interfacing side magnetic unit; the interfacing connector is positioned at an outer side of the annular wall; the outer connector has a curved shape; the at least one casing side magnetic unit of the magnetic connecting device is a casing side magnetic unit which has an annular shape; the casing side connector further includes a concave hole located at a center of the casing side magnetic unit for receiving the protruded unit, and an annular groove surrounding an outer side of the casing side magnetic unit; the outer connector is positioned at an outer side of the annular groove; the connecting frame further includes a first ball; the interfacing side magnetic unit is connected between the casing side magnetic unit and the first ball.

9. The assembly structure for an electronic device protecting casing and an interfacing structure with magnetic connectors as claimed in claim 1, wherein the interfacing device is a single independent device.

10. The assembly structure for an electronic device protecting casing and an interfacing structure with magnetic connectors as claimed in claim 1, wherein the interfacing device is arranged on various external device.

11. The assembly structure for an electronic device protecting casing and an interfacing structure with magnetic connectors as claimed in claim 1, wherein the interfacing device is arranged on a table.

12. The assembly structure for an electronic device protecting casing and an interfacing structure with magnetic connectors as claimed in claim 1, wherein the tablet form electronic device is selected from one of a mobile phone, a tablet computer, a notebook computer and a PDA (personal digital assistant).

\* \* \* \* \*